UNITED STATES PATENT OFFICE.

MAX HENRY ISLER, OF MANNHEIM, HUGO WOLFF, OF LUDWIGSHAFEN-ON-THE-RHINE, AND FILIP KAČER, OF MANNHEIM, GERMANY, ASSIGNORS TO BADISCHE ANILIN & SODA FABRIK, OF LUDWIGSHAFEN-ON-THE-RHINE, GERMANY, A CORPORATION OF GERMANY.

ANTHRACENE DYE AND PROCESS OF MAKING SAME.

No. 929,443.     Specification of Letters Patent.     Patented July 27, 1909.

Application filed March 25, 1909. Serial No. 485,673.

To all whom it may concern:

Be it known that we, MAX HENRY ISLER, chemist, and HUGO WOLFF and FILIP KAČER, doctors of philosophy and chemists, respectively a citizen of the Swiss Republic, a subject of the Grand Duke of Baden, and a subject of the King of Prussia, residing the second-named at Ludwigshafen-on-the-Rhine and the others at Mannheim, all in Germany, have invented new and useful Improvements in Anthracene Dyes and Making the Same, of which the following is a specification.

In the specification of German Patent No. 162,824 is described the production of dianthraquinone imids by condensing 1-halogen-anthraquinone with 1-amino-anthraquinone, or with 2-amino-anthraquinone, or with derivatives of 1-amino-anthraquinone, and in the specification of Letters Patent No. 814,137 is described the condensation of 2-chlor-anthraquinone with 1-amino-anthraquinone.

We have now discovered that compounds possessing properties different from those of the aforementioned products and being vat coloring matters of excellent fastness, can be obtained by condensing 1-amino-anthraquinone with a derivative of a 2-halogen-anthraquinone compound, or by condensing a derivative of a 1-amino-anthraquinone compound with a 2-halogen-anthraquinone, or with a derivative thereof. In each case there is obtained a substituted alpha-beta-dianthraquinone imid containing only two anthraquinone residues.

As examples of the derivatives of 1-aminoanthraquinone and of 2-halogen-anthraquinone which can be used for the purposes of our invention, we mention the alkylamino and aryl-amino derivatives, the acyl-amino derivatives, the alkyl-oxy and aryl-oxy derivatives, and those obtained when an extra ring is joined to the anthraquinone group, for instance amino-anthraquinone-quinolin. Derivatives such as 1-amino-6-halogen-anthraquinone and 1-amino-7-halogen-anthraquinone, as well as diamino-anthraquinone, and dihalogen-anthraquinones, which, by permitting further condensation, give rise to compounds containing more than two anthraquinone residues and also derivatives which do not contain the two ketone groups intact, are not to be used for the purposes of this invention.

The following are examples of how our invention can be carried into practical effect, but our invention is not confined to these examples. The parts are by weight.

Example 1: Boil together for from five, to seven, hours, fourteen parts of 1-methyl-amino-6-chlor-anthraquinone (obtainable by boiling 1-nitro-6-chlor-anthraquinone with a solution of methyl-amin), twelve parts of 1-amino-anthraquinone, two hundred and fifty parts of nitrobenzene, one-half part of copper oxid, and seven parts of calcined soda. When the product is cold, filter off the coloring matter, wash it with alcohol, and then with dilute hydrochloric acid, and preserve for use in the form of paste. In this example, instead of 1-methyl-amino-6-chlor-anthraquinone, an equal quantity of 1-methyl-amino-7-chlor-anthraquinone can be used and the corresponding coloring matter be obtained.

Example 2: Condense together twenty-five parts of 1-amino-6-methyl-amino-anthraquinone (obtainable by heating 1-amino-6-chlor-anthraquinone with a solution of methyl-amin under pressure and at a temperature of one hundred and seventy degrees centigrade), and twenty-four parts of 2-chlor-anthraquinone as described in the foregoing Example 1. The corresponding coloring matter can be obtained by employing 1-amino-7-methyl-amino-anthraquinone instead of 1-amino-6-methyl-amino-anthraquinone.

Example 3: Condense together twenty parts of 1-amino-6-methyl-amino-anthraquinone and twenty parts of 2-chlor-5-methyl-amino-anthraquinone (obtainable by boiling 5-nitro-2-chlor-anthraquinone with a solution of methyl-amin in pyridin), as described in the foregoing Example 1. The corresponding coloring matters can be obtained by employing 1-amino-7-methyl-amino-anthraquinone instead of 1-amino-6-methyl-amino-anthraquinone, or by employing 2-chlor-8-methyl-amino-anthraquinone instead of 2-chlor-5-methyl-amino-anthraquinone.

Example 4: Condense together seventeen parts of 2-chlor-5-toluido-anthraquinone (obtainable by boiling 2-chlor-5-nitro-anthraquinone with para-toluidin), and eleven parts of 1-amino-anthraquinone as described in the foregoing Example 1. The corresponding coloring matters can be obtained by employing 2-chlor-8-toluido-anthraquinone instead of 2-chlor-5-toluido-anthraquinone, or by employing 1-amino-6-methyl-amino-anthraquinone, or 1-amino-7-methyl-amino-anthraquinone instead of 1-amino-anthraquinone.

Example 5: Condense together twenty-three parts of 1-amino-anthraquinone and twenty-eight parts of 2-chlor-8-methoxy-anthraquinone (obtainable by treating 2-chlor-8-nitro-anthraquinone with a solution of caustic potash in methyl alcohol), as described in the foregoing Example 1. The corresponding coloring matters can be obtained by employing 2-chlor-5-methoxy-anthraquinone, or 2-chlor-5-oxy-anthraquinone, or 2-chlor-8-oxy-anthraquinone, or the corresponding phenoxy derivatives, instead of 2-chlor-8-methoxy-anthraquinone.

Example 6: Condense together fifteen parts of 2-chlor-5-nitro-anthraquinone (obtainable by replacing by chlorin the sulfonic acid group in 5-nitro-anthraquinone-2-sulfonic acid), and eleven and two-fifths parts of 1-amino-anthraquinone as described in the foregoing Example 1. The corresponding coloring matter can be obtained by employing 2-chlor-8-nitro-anthraquinone instead of 2-chlor-5-nitro-anthraquinone.

Example 7: Condense together fifteen parts of 1-amino-anthraquinone and twenty and one-tenth parts of 2-chlor-8-acetyl-amino-anthraquinone (obtainable by acetylating 2-chlor-8-amino-anthraquinone) as described in the foregoing Example 1.

Example 8: Condense together, as described in the foregoing Example 1, eight parts of 1-amino-anthraquinone and ten parts of the product obtained by heating 1-acetyl-amino-7-chlor-anthraquinone with phosphorus oxychlorid by the process described in the specification of Letters Patent No. 863,401. The corresponding coloring matter can be obtained by employing the product obtainable in a similar manner from 1-acetyl-amino-6-chlor-anthraquinone.

Example 9: Condense together twelve parts of amino-anthraquinone-2.3-quinolin (obtainable by the nitration and subsequent reduction of anthraquinone-2.3-quinolin), and thirteen and one-fifth parts of 2-chlor-8-acetyl-amino-anthraquinone as described in the foregoing Example 1. The corresponding coloring matters can be obtained by employing 2-chlor-anthraquinone, or 2-chlor-5-nitro-anthraquinone, or 2-chlor-8-nitro-anthraquinone, instead of 2-chlor-8-acetyl-amino-anthraquinone.

Example 10: Condense together twelve parts of amino-anthraquinone-2.1-quinolin (obtainable by the nitration and subsequent reduction of anthraquinone-2.1-quinolin), and thirteen and one-fifth parts of 2-chlor-5-acetyl-amino-anthraquinone, as described in the foregoing Example 1. The corresponding coloring matters can be obtained by employing the isomeric amino-anthraquinone-1.2-quinolin, or 5-amino-2.3-anthraquinone-quinolin, instead of amino-anthraquinone-2.1 quinolin.

In the foregoing Examples 9 and 10 the nitrogen atom of the pyridin ring is attached to the first-mentioned carbon atom of the anthraquinone residue.

In the foregoing examples the copper oxid can be replaced by copper salts, or by metallic copper, and, instead of sodium carbonate, other agent capable of fixing hydrochloric acid can be used, for instance sodium acetate, potassium carbonate, or calcium hydrate, and the nitrobenzene can be replaced by naphthalene, or other indifferent solvent of high boiling point.

The following table states some of the properties of the coloring matters produced according to the foregoing examples:—

| First described coloring matter produced according to the foregoing. | Solution in— | | | Dyes cotton from a hydrosulfite vat. |
|---|---|---|---|---|
| | Concentrated sulfuric acid. | Concentrated sulfuric acid+boric acid. | Concentrated sulfuric acid+boric acid, hot. | |
| Example. | | | | |
| 1 | Bottle-green. | Violet-blue. | Violet. | Brownish red. |
| 2 | Bottle-green. | Violet-blue. | Violet. | Brownish red. |
| 3 | Brown. | Brown-violet. | Violet. | Bordeaux. |
| 4 | Olive, (fluorescent.) | Blue-violet. | Red-violet. | Bordeaux. |
| 5 | Brown-yellow. | Brown-red. | Dull red. | Brick red. |
| 6 | Dull bottle-green. | Unchanged. | Blue-violet. | Dull red. |
| 7 | Bottle-green. | Blue-violet. | Violet. | Brick red. |
| 8 | Red-brown. | Unchanged. | Violet-brown. | Brick red. |
| 9 | Dull blue-green. | Unchanged. | Violet. | Brick red. |
| 10 | Brownish olive. | Unchanged. | Blue. | Violet-brown. |

Now what we claim is:

1. The process of producing coloring matter of the anthracene series being substituted alpha-beta-dianthraquinone-imids by condensing a 1-amino-anthraquinone body with a 2-halogen-anthraquinone body both of such anthraquinone bodies containing the two ketonic groups intact and one at least of such anthraquinone bodies being substituted by a substituent which is incapable of reacting on the other anthraquinone body employed.

2. The process of producing coloring matter of the anthracene series by condensing 1-methyl-amino-6-chlor-anthraquinone with 1-amino-anthraquinone.

3. As new articles of manufacture the coloring matters of the anthracene series being substituted alpha-beta-dianthraquinone imids which can be obtained by condensing a 1-amino-anthraquinone body with a 2-halogen-anthraquinone body both of such anthraquinone bodies containing the two ketonic groups intact and one at least of such anthraquinone bodies being substituted by a substituent which is incapable of reacting on the other anthraquinone body employed, which coloring matters yield from red-brown to green solutions in cold concentrated sulfuric acid, from brown-red to violet-blue solutions in cold concentrated sulfuric acid to which boric acid has been added, from red to blue solutions in hot concentrated sulfuric acid to which boric acid has been added, and which dye cotton from a hydrosulfite vat yielding red to violet-brown shades.

4. As a new article of manufacture the coloring matter of the anthracene series which can be obtained by condensing 1-methyl-amino-6-chlor-anthraquinone with 1-amino-anthraquinone, which coloring matter yields a bottle green solution in cold sulfuric acid, a violet-blue solution in cold concentrated sulfuric acid to which boric acid has been added, a violet solution in hot concentrated sulfuric acid to which boric acid has been added, and which dyes cotton from a hydrosulfite vat yielding brownish red shades.

In testimony whereof we have hereunto set our hands in the presence of two subscribing witnesses.

MAX HENRY ISLER.
    HUGO WOLFF.
    FILIP KAČER.

Witnesses:
 J. ALEC. LLOYD,
 JOS. H. LEUTE.